Figure 1:
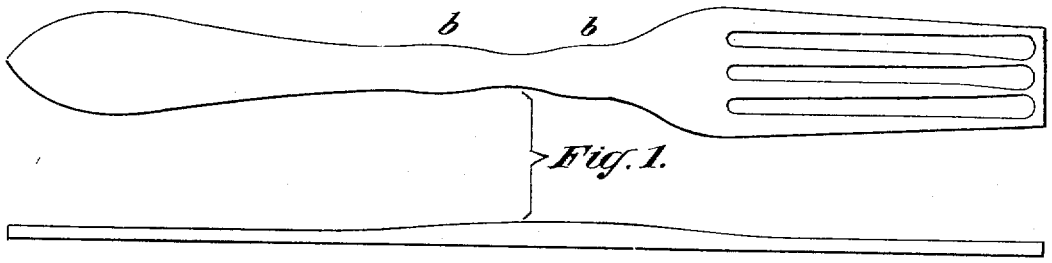

Le R. S. WHITE.

Assignor to Brown & Brothers.

MANUFACTURE OF TABLE FORKS AND SPOONS.

No. 7,633. Reissued April 24, 1877.

Witnesses
John Becker
Fred. Haynes

LeRoy S. White
by his Attorneys
Brown & Allen

UNITED STATES PATENT OFFICE.

LE ROY S. WHITE, OF WATERBURY, CONNECTICUT, ASSIGNOR TO BROWN & BROTHERS, OF SAME PLACE.

IMPROVEMENT IN THE MANUFACTURE OF TABLE-FORKS AND SPOONS.

Specification forming part of Letters Patent No. 178,218, dated May 30, 1876; reissue No. 7,633, dated April 24, 1877; application filed March 29, 1877.

*To all whom it may concern:*

Be it known that I, LE ROY S. WHITE, of Waterbury, in the county of New Haven and State of Connecticut, have invented a new and useful Improvement in the Manufacture of Table-Forks and Spoons, which improvement is fully set forth in the following specification and accompanying drawing.

This invention relates to the manufacture of forks and spoons from German silver, and other ductile metals or alloys, in which the entire article, including its handle, is made from the same piece of metal. In the ordinary process of manufacturing such articles it is customary to cut out a blank, of a shape approximating to that of the fork or spoon, from metal which has been rolled to the required thickness.

In the further shaping and finishing of this blank no material change is made either in the width or thickness of that portion of the blank which is to form the shank of the fork or spoon. The width of that portion of the finished article is left the same as it was in the cut blank.

Although the blank is rolled to reduce its thickness toward the ends, and so leave a greater relative thickness at the shank, where the greatest strain comes in use, the best and strongest forks and spoons heretofore made, and more especially the forks, are very liable in use to be bent in that part, which, notwithstanding its greater thickness, is practically weaker than any other part.

To give a still greater relative thickness to the shank by the ordinary process of manufacture, which would have to be done by making the blank from thicker plate, and reducing it more by rolling toward the ends, would only imperfectly remedy the above-described defect.

My invention, while it admits of giving an extra thickness to the shank, does not necessarily involve any increased thickness of the sheet out of which the blank is cut; but it consists in condensing, hardening, and stiffening the metal in the shank by pressure applied to the blank on opposite edges of the shank, in a direction transverse to the direction of the pressure produced in the rolling of the blank, or the sheet from which it has been cut. This condensation gives to the metal in the shank a quality resembling a spring-temper, whereby it is not only enabled to better resist any pressure applied in a direction to bend it, and thus is not so easily bent, but, if it should yield in some degree to such pressure, it will return, by its elasticity, to its normal shape or condition.

To practically carry out this construction, the fork or spoon blank is formed with a lateral swell at its shank, or otherwise has a surplus width given it at such part, and subsequently its shank is subjected edgewise, in a direction transversely to its face, to the pressure of a drop-press or hammer, to condense and temper the metal in the shank, making it of a spring-like temper, or giving it increased density and stiffness at such part. This action of the drop-press or hammer may also serve to give an increased thickness to the shank in a direction perpendicular to the face of the article, so that the fork or spoon may be made from even a thinner metal sheet than usual, thereby reducing end-rolling of the blank, yet producing a much stiffer article at the shank.

In view of the preceding minute description of the invention it will only be necessary to briefly explain the drawing which illustrates it.

Figure 2:
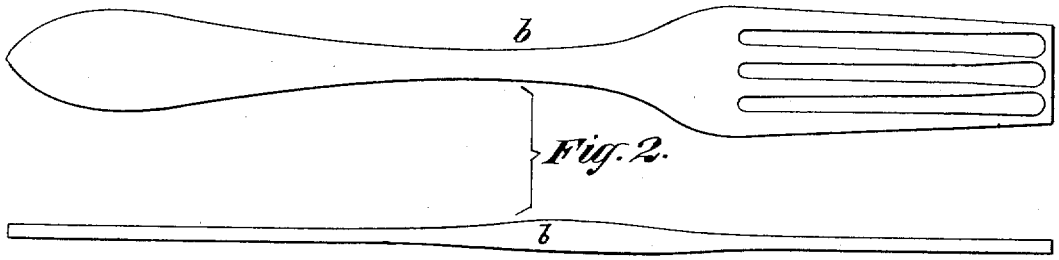
Figure 3:
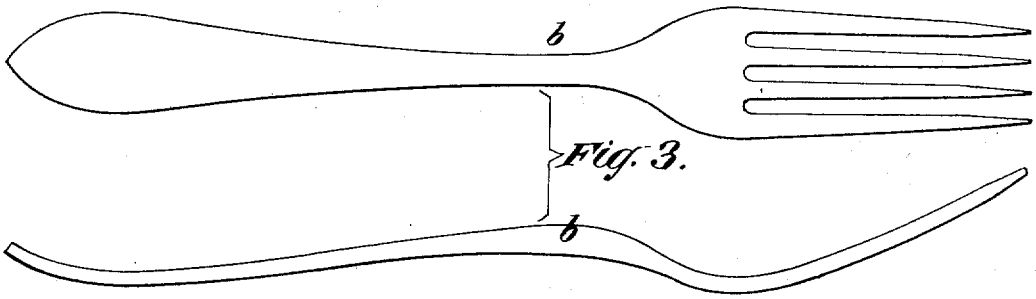

Figure 1 represents a face and edge view of a fork-blade formed with a swell or surplus width at its shank *b*, to provide for its being condensed by lateral pressure. Fig. 2 represents face and edge views of the same after the shank *b* has been condensed or compacted and hardened by being subjected in a drop-press to pressure in a lateral direction, which is a direction transverse to the pressure produced in the rolling of the sheet, the fork or spoon blank being turned up edgewise as regards the exposure of its shank to the action of the press. Fig. 3 represents face and edge views of the finished fork, which, while it does not necessarily differ in form from other forks, has its shank *b* condensed or hardened into a spring-like temper by the process or method of manufacture hereinbefore described.

What I claim as my invention is—

The improvement in the art of manufacturing forks and spoons, consisting in cutting out a blank with a lateral swell in the shank, or with the shank of a width greater than is required for the finished article, and subsequently condensing or hardening the metal in the shank by pressure applied in a direction transverse to the direction of the pressure produced in the rolling of the blank, and of the sheet from which it has been cut, substantially as and for the purpose herein described.

LE ROY S. WHITE.

Witnesses:
G. H. CLOWES,
HIRAM VAN DUSEN.